(12) United States Patent
Evans

(10) Patent No.: US 8,281,967 B2
(45) Date of Patent: Oct. 9, 2012

(54) STORAGE UNIT FOR TRUCK BEDS

(75) Inventor: Darin Evans, Spring Lake, MI (US)

(73) Assignee: Shape Corp., Grand Haven, MI (US)

( * ) Notice: Subject to any disclaimer, the term of this patent is extended or adjusted under 35 U.S.C. 154(b) by 1065 days.

(21) Appl. No.: 12/206,952

(22) Filed: Sep. 9, 2008

(65) Prior Publication Data

US 2009/0071991 A1   Mar. 19, 2009

Related U.S. Application Data

(60) Provisional application No. 60/972,311, filed on Sep. 14, 2007.

(51) Int. Cl.
*B60R 9/06* (2006.01)

(52) U.S. Cl. ........ 224/404; 224/510; 224/543; 224/544; 224/547; 224/924; 296/37.6

(58) Field of Classification Search .............. 224/404, 224/510, 539, 542, 543, 544, 547, 548, 554, 224/924; 414/462; 280/769; 296/26.09, 296/37.6; 220/771
See application file for complete search history.

(56) References Cited

U.S. PATENT DOCUMENTS

| | | | |
|---|---|---|---|
| 2,058,682 A * | 10/1936 | Green | 414/537 |
| 3,940,009 A | 2/1976 | Szeles | |
| 4,215,896 A | 8/1980 | Drouin | |
| 4,451,075 A | 5/1984 | Canfield | |
| 4,770,330 A | 9/1988 | Bonstead et al. | |
| 4,863,213 A | 9/1989 | Deaver et al. | |
| 4,884,838 A | 12/1989 | Slater | |
| 4,921,152 A * | 5/1990 | Kemming | 224/543 |
| 4,938,398 A | 7/1990 | Hallsen | |
| 5,076,636 A | 12/1991 | Buck et al. | |
| 5,083,829 A | 1/1992 | Fonseca | |
| 5,154,470 A | 10/1992 | Bringman, Jr. | |
| 5,207,469 A | 5/1993 | Rossi | |
| 5,232,259 A * | 8/1993 | Booker | 296/37.6 |
| 5,324,092 A | 6/1994 | Burg | |
| 5,476,201 A * | 12/1995 | Hall et al. | 224/924 |
| 5,498,049 A | 3/1996 | Schlachter | |
| 5,498,058 A | 3/1996 | Kuo | |
| 5,564,776 A | 10/1996 | Schlachter | |
| 5,688,020 A | 11/1997 | Burg | |

(Continued)

FOREIGN PATENT DOCUMENTS

DE         4018072 A1 *  6/1991 .................... 362/157

*Primary Examiner* — Gary Elkins
(74) *Attorney, Agent, or Firm* — Price Heneveld, LLP

(57) ABSTRACT

A storage unit is anchored in a truck bed with an attachment system incorporating side modules forming a track for easy pull-out and yet security when moved to a storage position within the truck bed. The storage unit and/or the side modules have recesses and components shaped for function and utility, as well as security and yet easy access. For example, the side modules can include a stationary light, a pull-out spot light, an electrical plug, a storage recess with a lockable cover, and/or a tool-holding recess. The storage unit includes functionally-shaped walls, pull-out containers and drawers, repositionable dividers for the storage recess, a lockable cover, handles to facilitate carriage, wheels for rolling transport, walls with external cable anchors for tying down items, and/or an air deflector/spoiler. The side modules can be releasable for use as a suitcase-like separate unit.

17 Claims, 9 Drawing Sheets

U.S. PATENT DOCUMENTS

| | | | |
|---|---|---|---|
| 5,727,835 A * | 3/1998 | Krush et al. | 296/37.6 |
| 5,735,567 A | 4/1998 | Mora, Sr. | |
| 5,743,589 A | 4/1998 | Felker | |
| 5,924,616 A | 7/1999 | Shives | |
| 5,964,492 A | 10/1999 | Lyon | |
| 5,992,719 A * | 11/1999 | Carter, III | 224/404 |
| 6,012,762 A | 1/2000 | Burg | |
| 6,073,985 A | 6/2000 | Keip | |
| 6,082,804 A * | 7/2000 | Schlachter | 296/37.6 |
| 6,170,724 B1 | 1/2001 | Carter et al. | |
| 6,174,012 B1 | 1/2001 | Saffold | |
| 6,325,448 B1 | 12/2001 | Estrada et al. | |
| 6,502,885 B1 | 1/2003 | Gammon et al. | |
| 6,596,941 B2 * | 7/2003 | Tripoli | 174/68.1 |
| 6,626,480 B2 | 9/2003 | Anderson | |
| 6,641,013 B2 | 11/2003 | Dise | |
| 6,786,623 B2 * | 9/2004 | Snyder et al. | 362/485 |
| 6,824,184 B2 | 11/2004 | Leitner et al. | |
| 6,913,304 B1 | 7/2005 | Sweet | |
| 6,923,354 B2 * | 8/2005 | Axelson | 224/404 |
| 6,935,670 B2 | 8/2005 | Bright | |
| 6,974,171 B1 | 12/2005 | Taylor | |
| 6,981,780 B2 * | 1/2006 | Einav | 362/154 |
| 7,726,719 B1 * | 6/2010 | Barron | 296/37.6 |
| 2003/0221305 A1 | 12/2003 | Burg | |
| 2005/0047118 A1 * | 3/2005 | Spahr et al. | 362/109 |

* cited by examiner

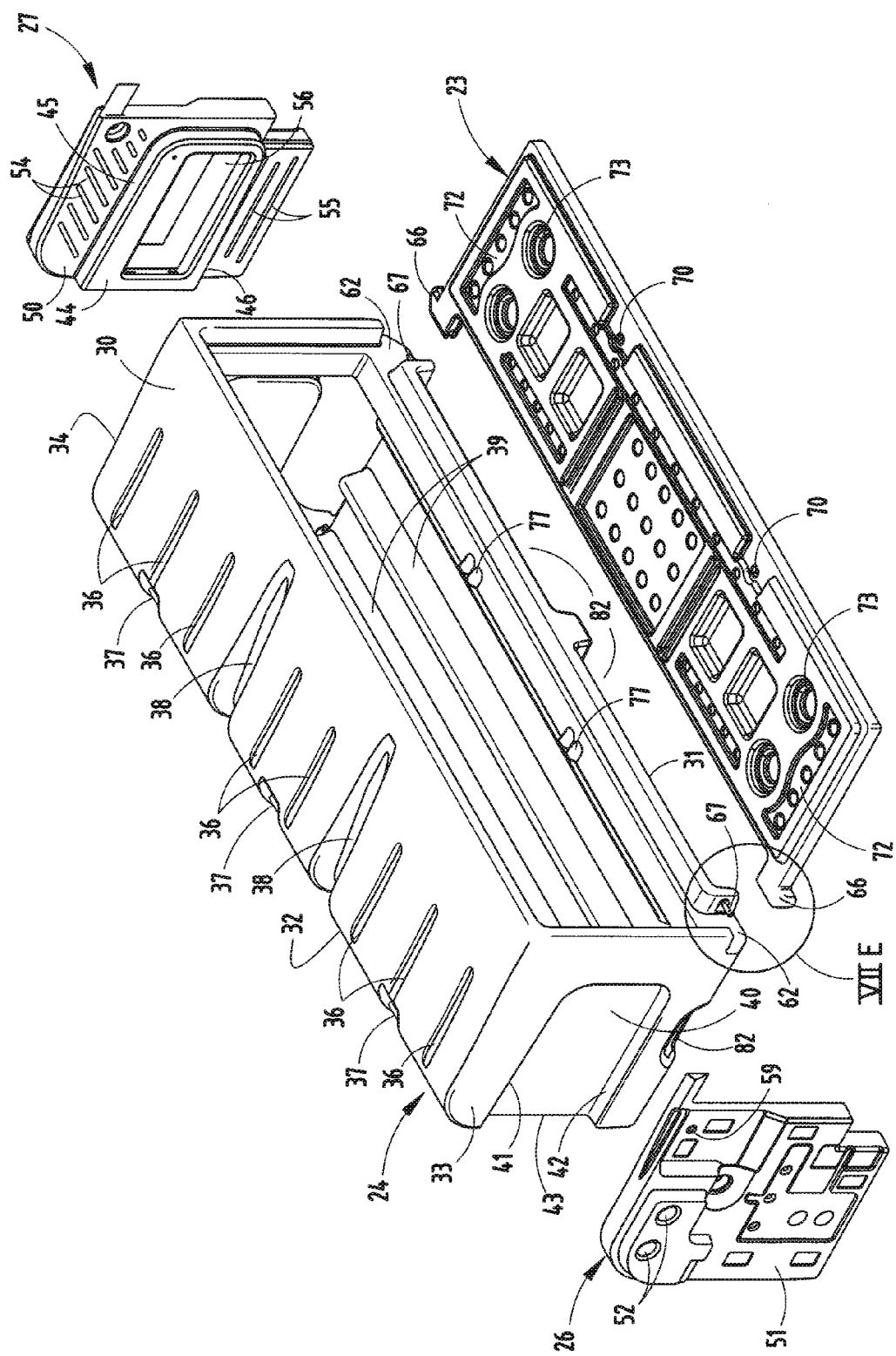

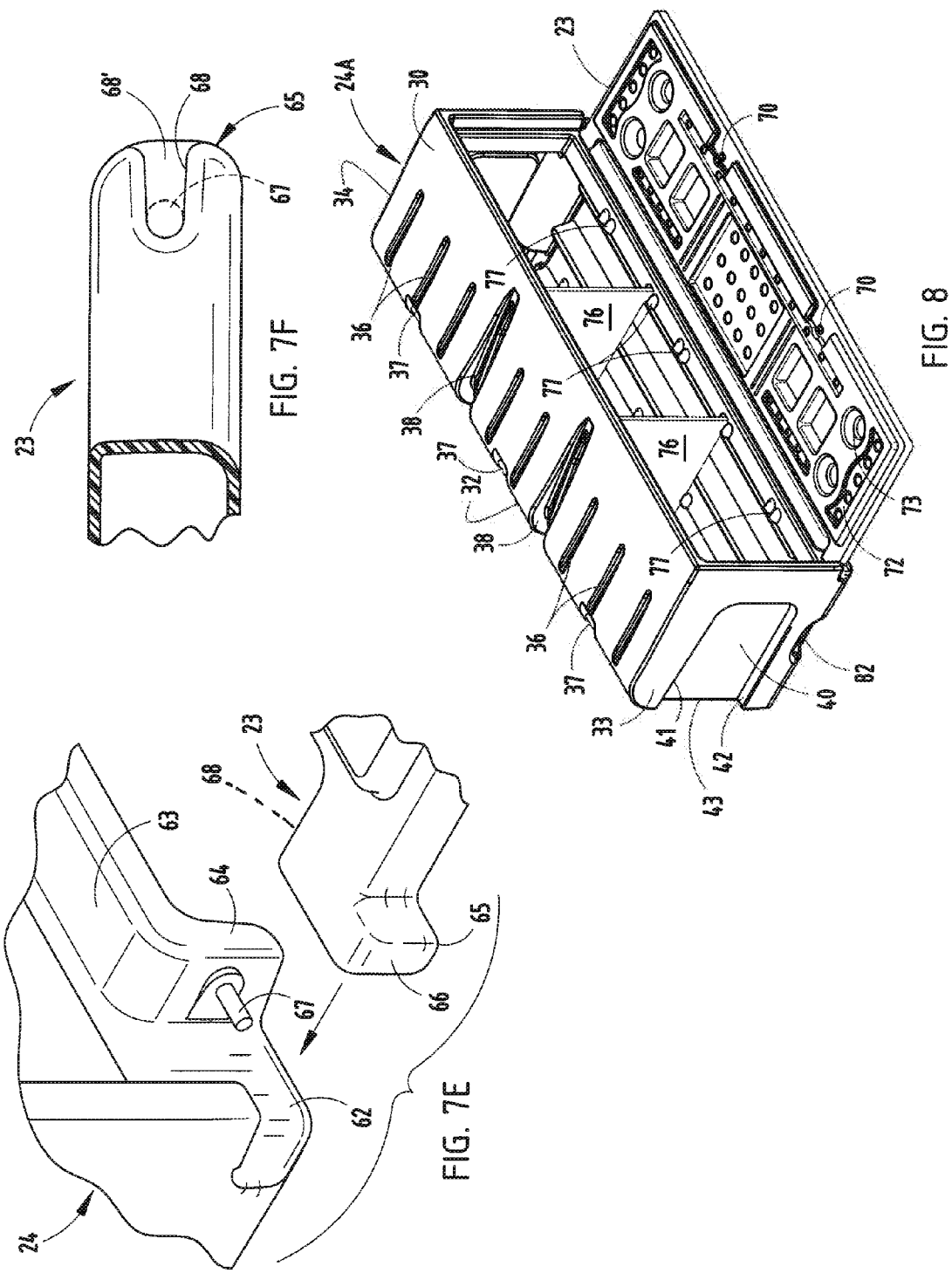

STORAGE UNIT FOR TRUCK BEDS

This application claims benefit under 35 U.S.C. §119(e) of provisional application Ser. No. 60/972,311, filed Sep. 14, 2007, entitled STORAGE UNIT FOR TRUCK BEDS.

BACKGROUND

The present invention relates to storage units for storing items in truck beds, and more particularly relates to storage units that are adapted for efficient and ease of use, and that are adapted to facilitate installation and removal, yet are configured for aesthetics, durability, and function.

Truck beds (also called "truck box") (i.e., the rear open storage area of trucks) are designed for storing and carrying items therein. However, it is often difficult to place items into and/or take items out of a truck bed due to high side panels and tailgates, and further it is often difficult to reach the items in the truck bed due to their shifting during transport. Additionally, it is difficult to keep the items in an organized arrangement in the truck beds since items slide and shift. Many storage units and organizers for truck beds have been proposed, but further improvement is desired in terms of their ease of use, ease of installation and/or removability of the storage unit, aesthetics, durability and overall functionality. Further, many storage systems are not as secure as desired and further are not lockable nor do they offer hidden and/or secondarily lockable storage areas.

SUMMARY OF THE PRESENT INVENTION

In one aspect of the present invention, a storage apparatus is provided for storing items in a truck bed. The storage apparatus includes a storage unit shaped to fit into the truck bed, and an attachment system with side modules each having an inner surface mating with ends of the storage unit and an outer surface adapted to mate with an inside of the truck bed for holding the storage unit in a stable position in the truck bed, the storage unit being removably attached to the side modules.

In a narrower aspect, the side modules define a rearwardly extending track that engages ends of the storage unit to facilitate pulling the storage unit onto a tailgate of the truck bed for easier access.

In a narrower aspect, one or both of the side modules include functional features, such as a stationary bed light, a pull-out spot light on a flexible cable, an electrical power source plug, a storage recess with a lockable cover or retainer netting, a recess defining a tool holder (such as for a screw driver or etc), and/or a recess shaped to receive and retain a tool such as a car jack or tire nut removal tool.

In a narrower aspect, the storage unit itself includes functional features, such as a storage recess, pull-out containers and drawers, repositionable dividers for the storage recess, walls with internal depressions defining useful holders such as a cupholder or tool holder, a lockable cover, handles to facilitate carrying the storage unit away from the truck, wheels to facilitate rolling the storage unit like a two-wheel cart, walls with external depressions defining useful features such as a recess for receiving a bicycle tire/rim (to hold a bicycle upright during transport), a cable anchor for tying down items in the truck bed, and an air deflector/spoiler for improved air flow and better gas mileage.

In still another aspect of the present invention, a storage apparatus for storing items in a truck bed includes at least one side module with an outer surface adapted to mate with an inwardly-facing side of the truck bed for holding the side module in a stable position against the truck bed rearward of a vehicle wheel well and between the wheel well and a vehicle tailgate. The at least one side module includes at least one compartment and an access opening on an inboard side for accessing the at least one compartment, and further includes at least one retainer for retaining the side module in the stable position in the truck bed.

In another aspect of the present invention, a storage apparatus for storing items in a truck bed includes a storage unit shaped to fit into a truck bed, the storage unit including a wall defining at least one recess shaped to receive a bicycle wheel for stably supporting a bicycle stored thereagainst.

In another aspect of the present invention, a storage apparatus for storing items in a truck bed includes a storage unit shaped to fit into a truck bed. The apparatus further includes side modules each with an inner surface mating with ends of the storage unit and an outer surface adapted to mate with an inside of the truck bed for holding the storage unit in a stable position in the truck bed while allowing efficient access to the storage unit, one of the storage unit and the side modules including a light source for lighting an access area to the storage unit and wiring connected to the light source and adapted for connection to a vehicle electrical system.

In another aspect of the present invention, a storage apparatus for storing items in a truck bed includes a storage unit shaped to fit into a front or into a rear of a truck bed, and further includes attachment modules each with an inner surface mating with ends of the storage unit and an outer surface adapted to mate with an inside of the truck bed for holding the storage unit in a stable position in the truck bed while allowing efficient access to the storage unit. The outer surfaces of the attachment modules are configured for selective attachment to a surface in the front of the truck bed and also for attachment to a surface in the rear of the truck bed.

In still another aspect of the present invention, a storage apparatus for storing items in a truck bed includes a storage unit shaped to fit into a truck bed of a pickup truck and defining at least part of an elongated recess thereunder, and a ramp telescopingly stored in the recess and extendable to provide an inclined surface to assist in moving heavy objects into the storage unit.

An object is to provide an SUV style storage capability on a smaller scale, allowing truck owners to expand the capability of their beds by segmenting storage into compartments, including lockable compartments, and including various functional features.

An object is to improve the aerodynamics of trucks for improved gas mileage.

An object is to provide easy access to a truck bed by sliding, removability, and other methods which allow a truck owner to have most of their truck bed for use at any time.

An object is to provide a storage system that is easy to install and remove.

An object is to provide a common storage system with different side modules usable to anchor the common storage system to different truck beds.

These and other aspects, objects, and features of the present invention will be understood and appreciated by those skilled in the art upon studying the following specification, claims, and appended drawings.

BRIEF DESCRIPTION OF DRAWINGS

FIGS. 8-12 are perspective views of alternative storage units with different drawers, doors, and internal/external constructions.

DETAILED DESCRIPTION OF PREFERRED EMBODIMENTS

A plurality of different storage units are anchored in a truck bed with an attachment system incorporating side modules. The storage unit and/or the side modules incorporate different useful features. For example, one or both of the side modules can include functional features, such as a stationary bed light, a pull-out spot light on a flexible cable, an electrical power source plug, a storage recess with a lockable cover or retainer netting, a recess defining a tool holder (such as for a screw driver or etc), and/or a recess shaped to receive and retain a tool such as a car jack or tire nut removal tool. The storage unit itself can include functional features, such as a storage recess with particularly shaped functional walls, pull-out containers and drawers, repositionable dividers for the storage recess, walls with internal depressions defining useful holders such as a cupholder or tool holder, a lockable cover, handles to facilitate carrying the storage unit away from the truck, wheels to facilitate rolling the storage unit like a two-wheel cart, walls with external depressions defining useful features such as a recess for receiving a bicycle tire/rim (to hold a bicycle upright during transport), a cable anchor for tying down items in the truck bed, and an air deflector/spoiler for improved air flow and better gas mileage. The storage unit and/or the side modules can be adapted for particular uses, such as an icebox, a speaker, a stereo, a tank, or for use as a tackle box and/or for fishing equipment, for a gun and/or for hunting equipment, etc. Also, the attachment system can be made for universal attachment (i.e., adapted to fit different truck bed designs such as from different OEMs), or can be made to anchor the storage unit in a front or in a rear of the truck bed. The side modules can be releasable, and may include an outwardly extending flange with quarter-turn locking retainer adapted to securely engage a truck fender. In one form, the side module itself includes compartments, and can be removable for use as a suitcase-like separate unit, with a flange or other structure along its upper end that functions as a handle. A ramp may be telescopingly stored in a recess under the storage unit that is extendable to assist in moving heavy objects into the storage unit or onto the truck bed. The storage unit can also be made removable and portable (with handles or with two-wheels like a two-wheel cart).

Figure 1:
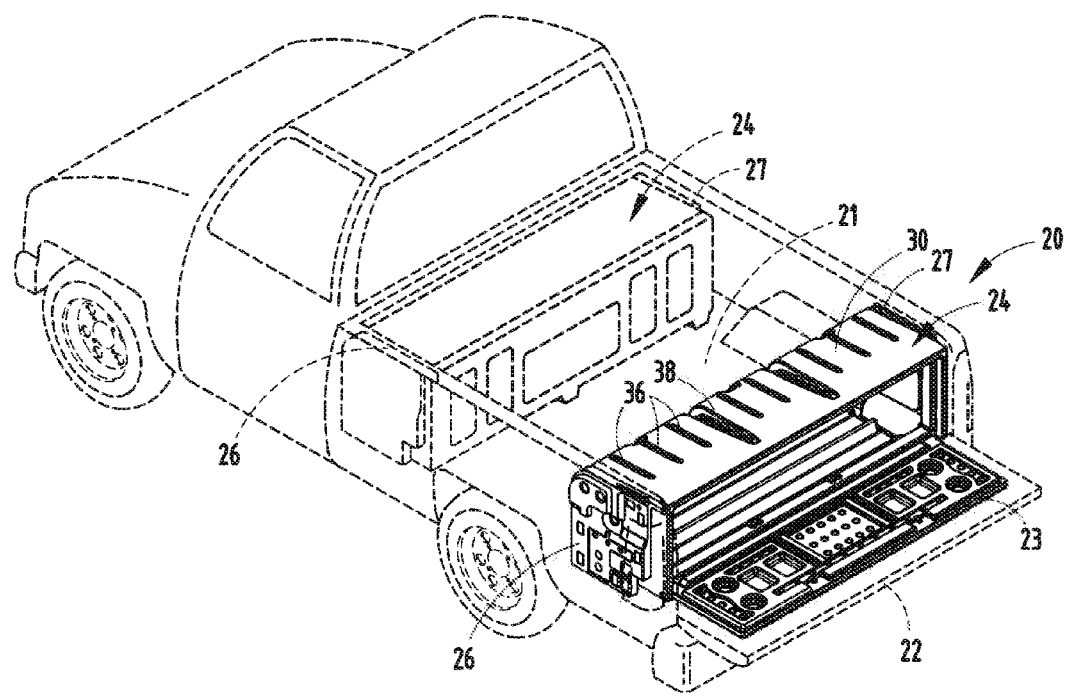
FIGS. 1-2 are perspective views of a storage apparatus in a rear of a truck bed with the tailgate opened, FIG. 1 showing a lockable door on the storage unit open and FIG. 2 showing the door closed.
Figure 2:
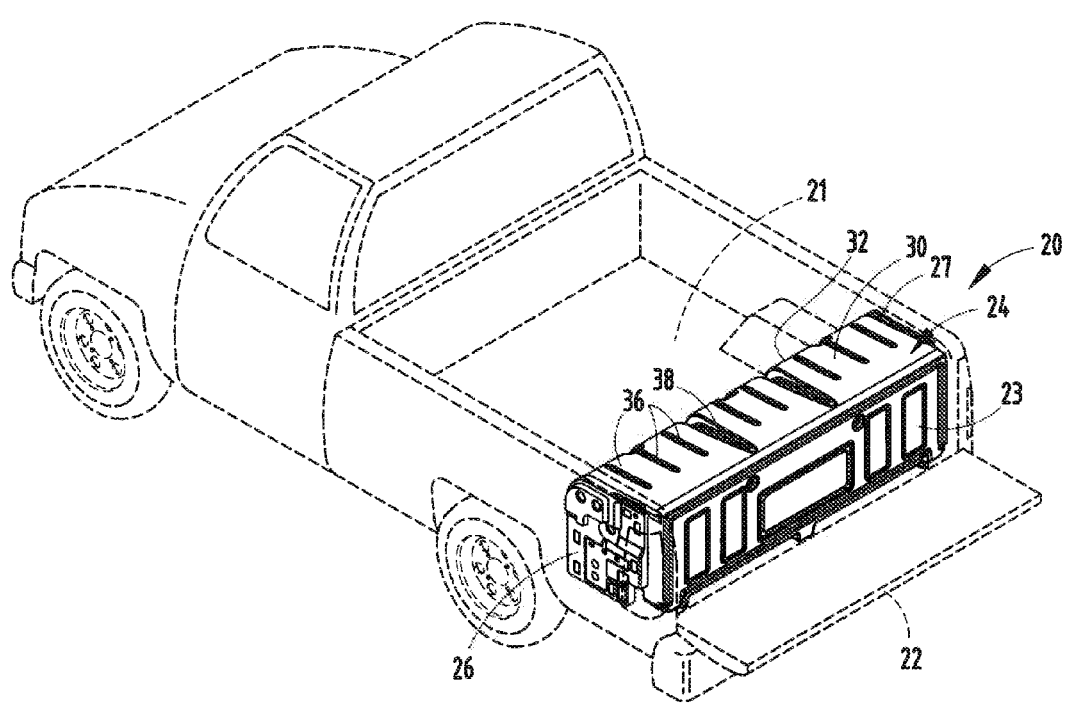
Figure 3:
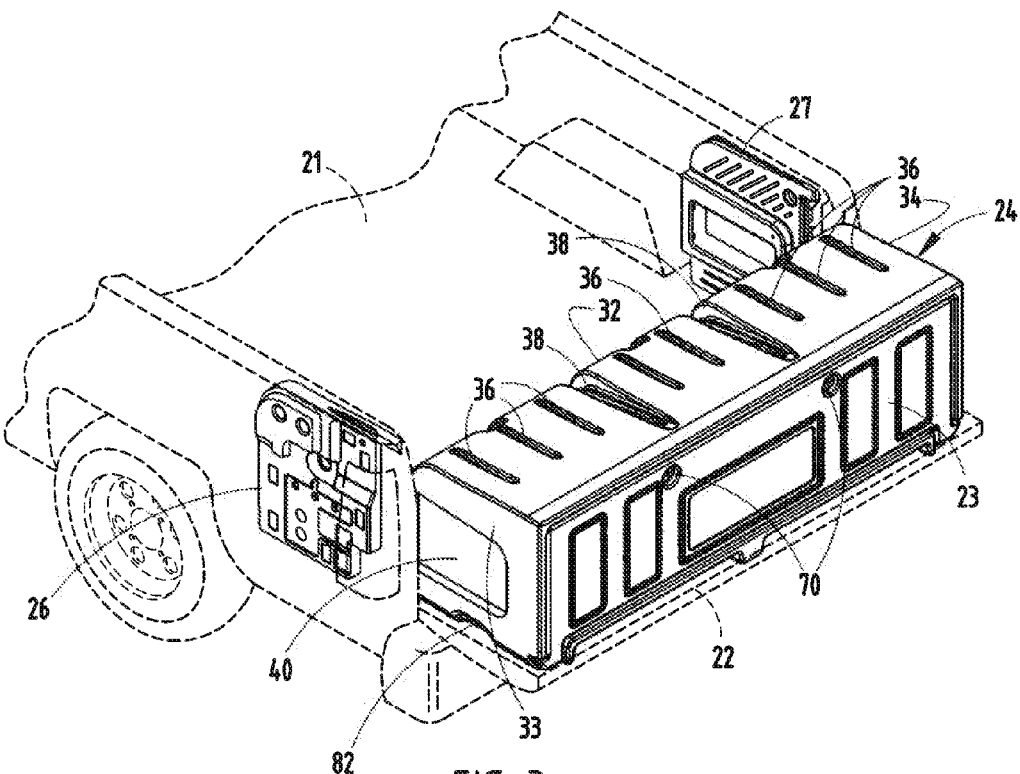
FIG. 3 is a perspective view of the storage apparatus of FIG. 1 pulled out onto the tailgate.
Figure 4:
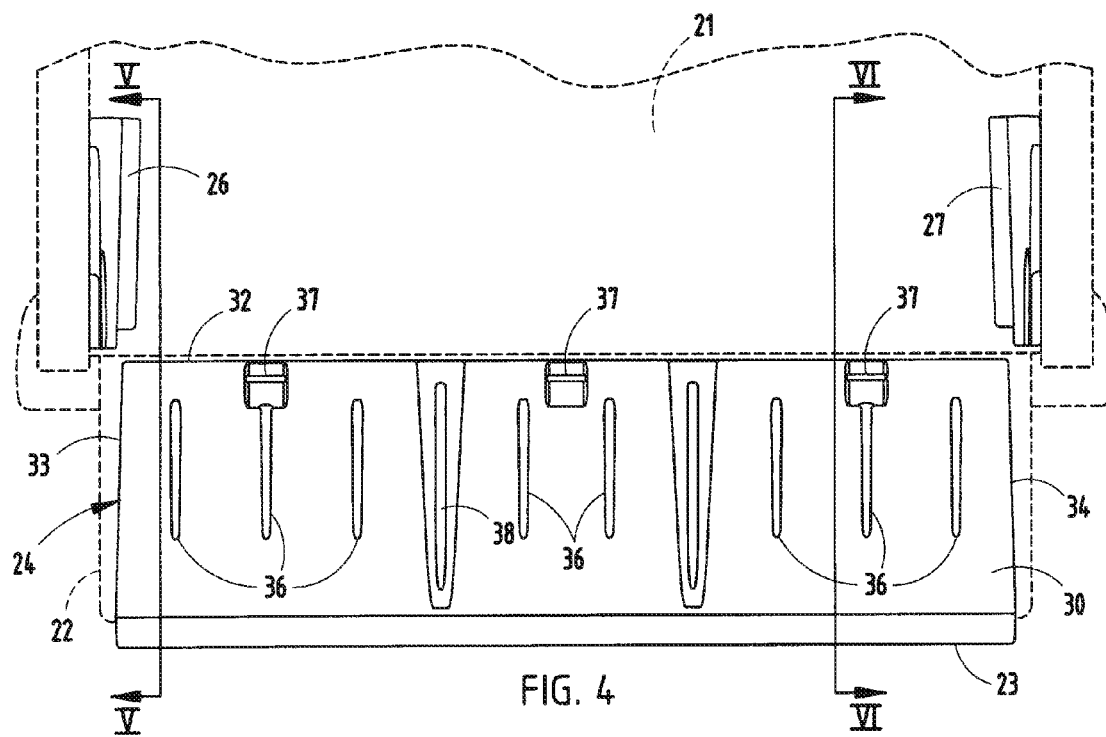
FIG. 4 is a top view of FIG. 3.
Figure 5:
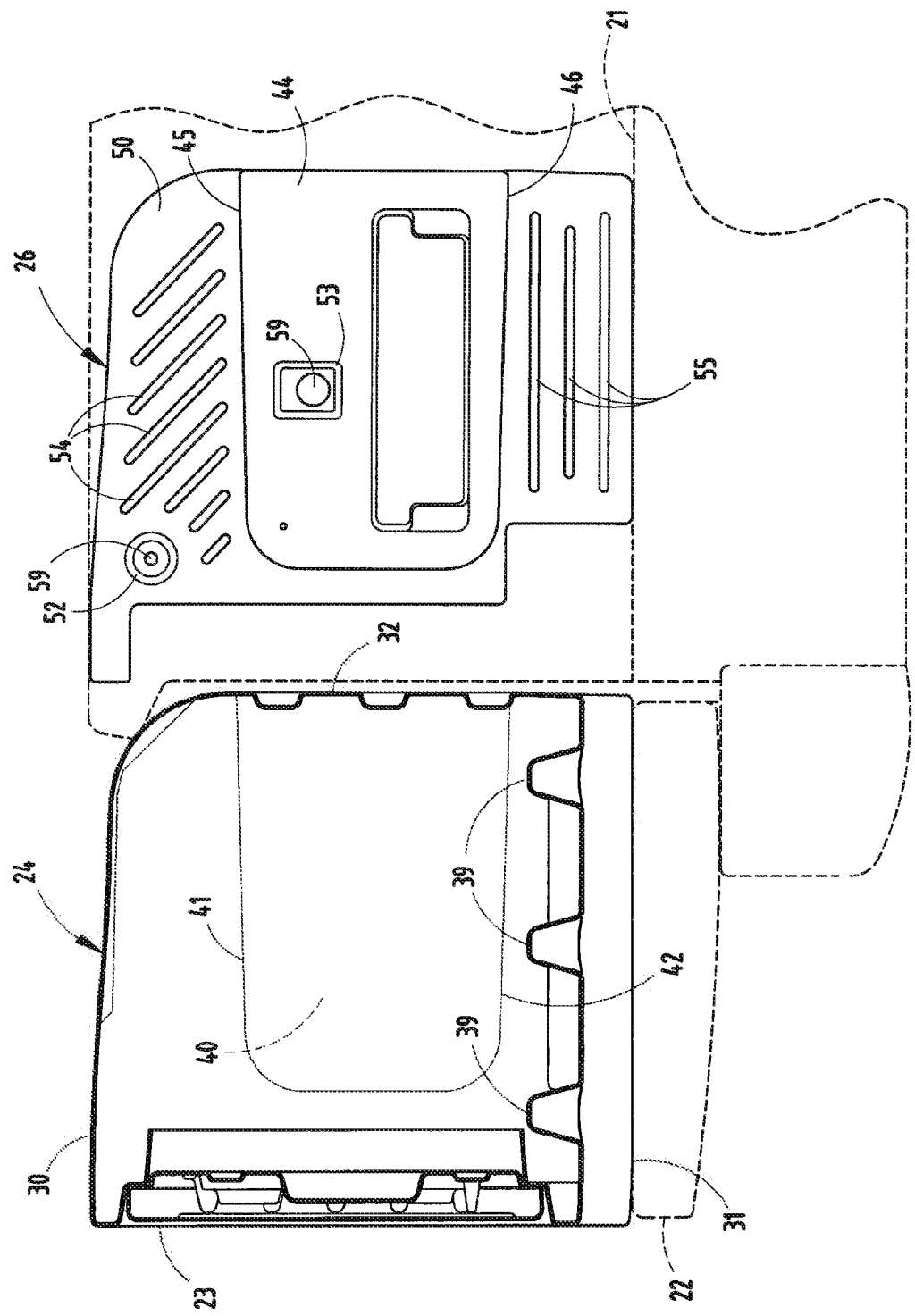
FIGS. 5-6 are views taken along lines V-V and VI-VI in FIG. 4.
Figure 6:
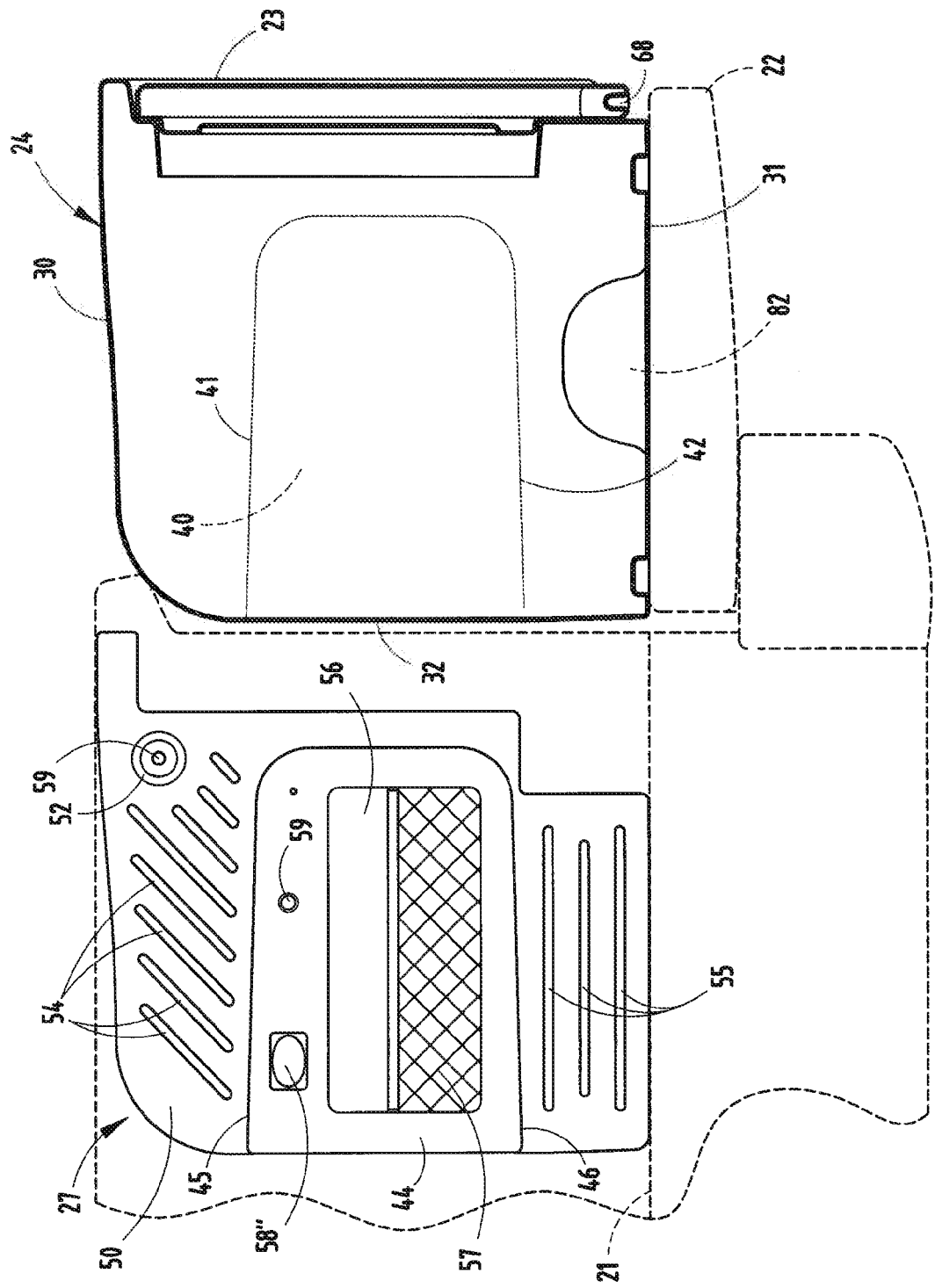
Figure 7A:
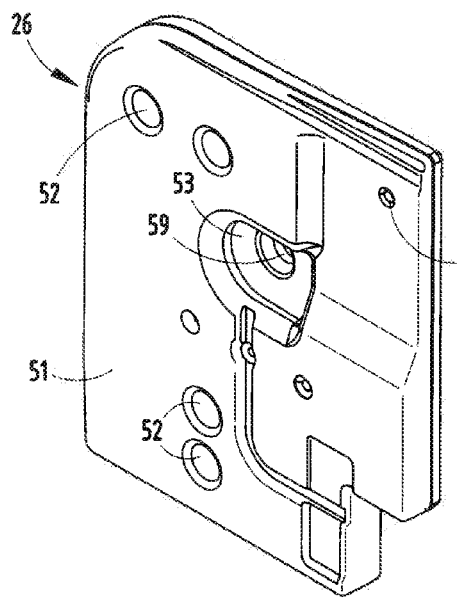
FIGS. 7A-7B are outside and inside perspective views of a left side module from FIG. 7, and FIGS. 7C-7D are inside and outside perspective views of a right side module from FIG. 7.
Figure 7B:
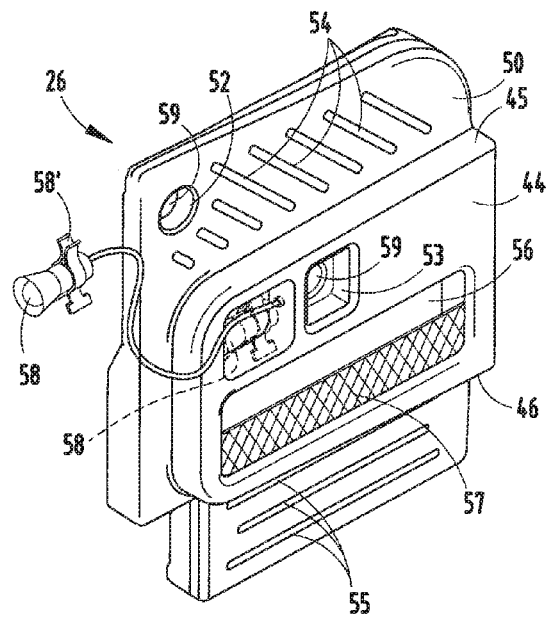
Figure 7C:
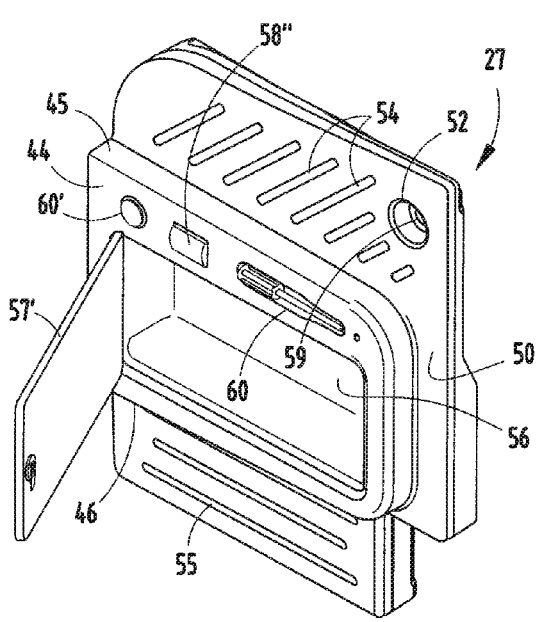
FIG. 7 is an exploded perspective view of the storage unit and side modules of FIGS. 1-3.
FIG. 7E is an enlarged fragmentary view of the circled area VIIE in FIG. 7.
FIG. 7F is a cross section taken along line VIIF-VIIF in FIG. 7E.
Figure 7D:
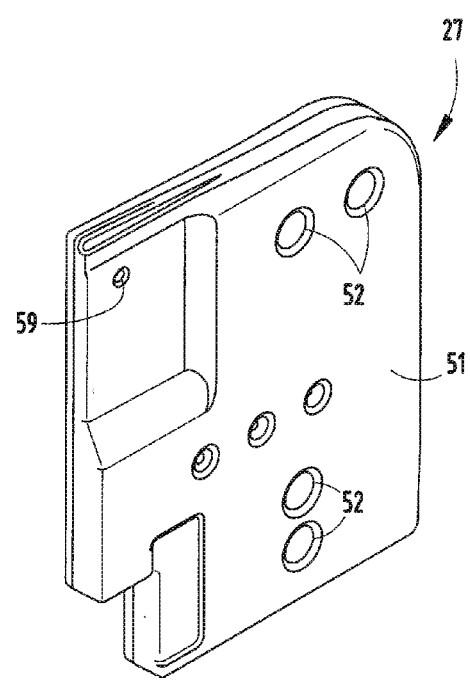
Figure 9:
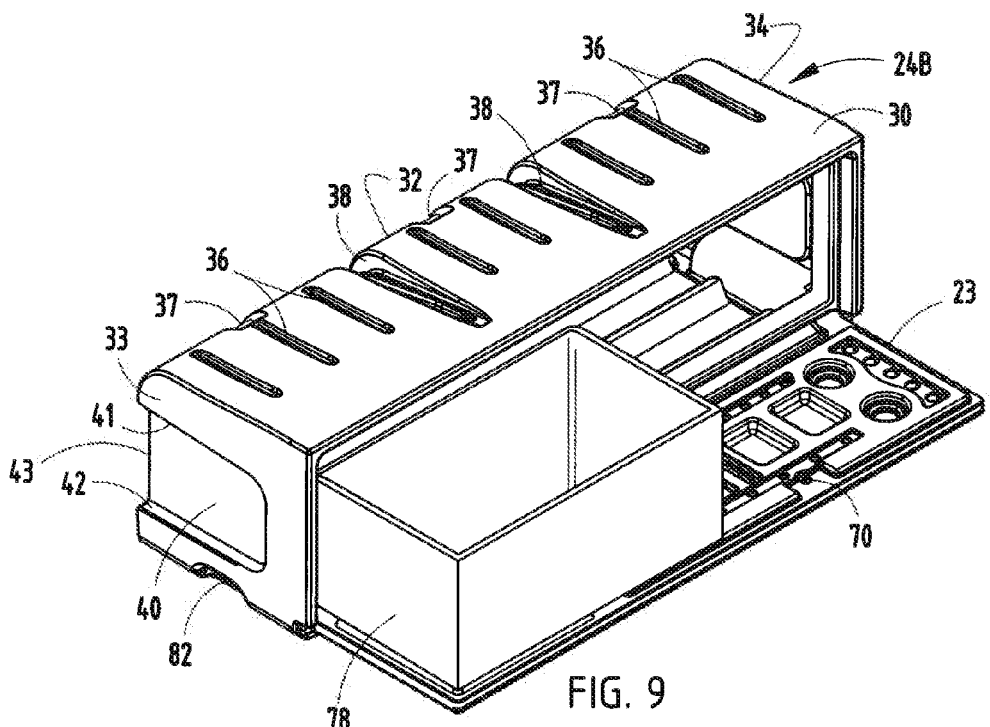
Figure 10:
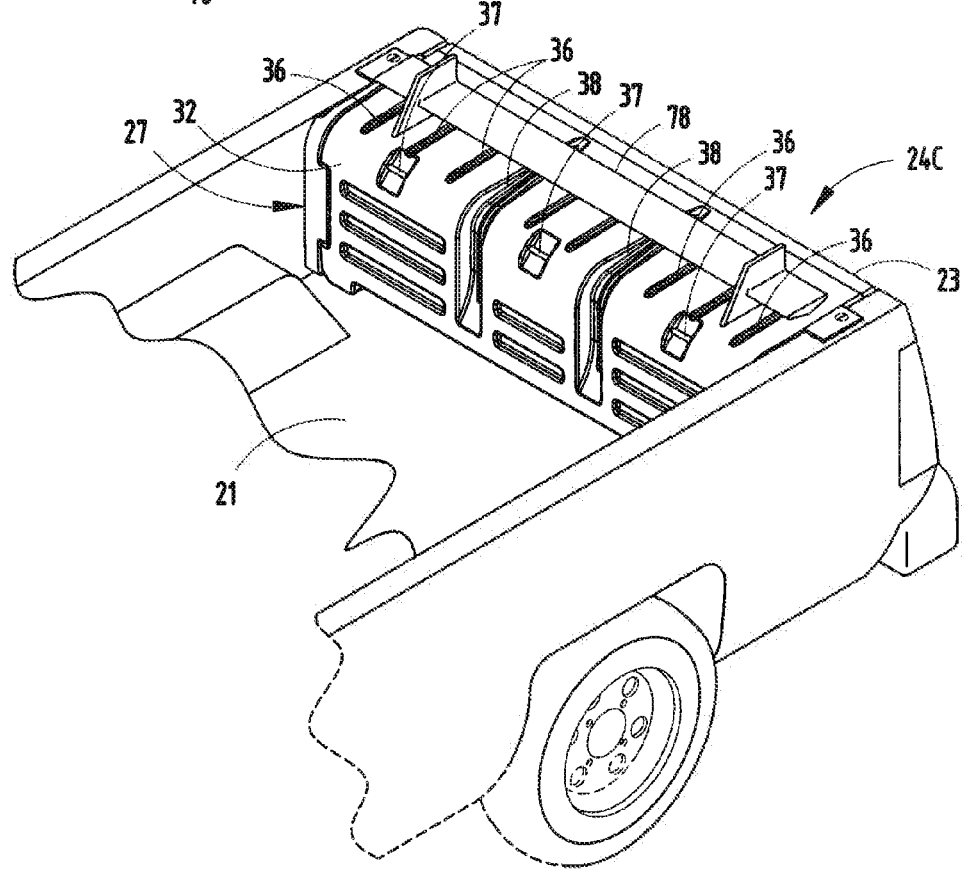

FIGS. 1-3 are perspective views of a storage apparatus 20 in a rear of a truck bed 21 with the tailgate 22 opened, FIG. 1 showing a lockable door 23 on the storage unit 24 open, FIG. 2 showing the door 23 closed, and FIG. 3 showing the storage unit pulled out onto the truck's tailgate for easier access. It is contemplated that a curtain, tarp, or heavy fabric can be used instead of a rigid solid door, since the tailgate itself provides security for the storage unit 24. However, the lock on the door 23 provides additional security such as when the tailgate is not locked and also when the storage unit 24 is pulled out onto the tailgate for easier access. Notably, the illustrated storage unit 24 and door 23 are made from durable plastic such as polypropylene, and are rotationally molded to form their respective walls, with the storage unit 24 being a single unitary part and the door 23 being a (separate) single unitary part. However, it is contemplated that the storage unit and door can also be multi-component assemblies.

Side modules 26-27 are provided for securing the storage unit 24 to the truck bed. The illustrated side modules 26-27 are made to be as universal as possible, so that they mate with different truck bed designs and constructions. Also, it is contemplated that the side modules 26-27 can be made to engage a rear of the truck bed (i.e. rearward of the wheel well, see solid lines in FIG. 1) and/or to engage a front of the truck bed (i.e. forward of the wheel well, see dashed lines in FIG. 1). The illustrated side modules 26-27 are made of plastic and rotationally molded, but it is contemplated that they can be made of different materials and different manufacturing/forming processes. Further, they can be made of different shapes, such as with an increased depth so that the storage unit can be pulled/slid between the wheel wells from a front to a rear of the truck bed.

The illustrated storage unit 24 (FIG. 7) includes top, bottom, rear, and side walls 30-34 with ribs and channels formed therein for strength and stability of the walls 30-34. For example, the top wall 30 includes fore-aft channels 36 and 38 for strength, with some of the channels 36 including a transverse stud anchor 37 positioned in a rear of several of the channels 36 and bridging across the channels to serve as tie-down anchors for cables (i.e. to anchor cargo in the truck bed in place during transport by using rope or bungee cords). Two of the fore-aft channels 38 are enlarged and rearwardly open to receive a bike tire/wheel for holding the bike in an upright position during transport. The bottom wall 31 includes transverse channels 39 for strength, but also that define therebetween spaces for holding tools in a generally stable position within the storage unit 24. The rear and side walls 32-34 include channels and irregular shapes for stability and also for function. For example, the rear walls 32 include portions of the channels 36 and 38.

The side walls 33-34 also define a recess 40 with diverging linear top and bottom edges 41 and 42 that slidably engage mating surfaces on the side modules 26 and 27 to define a track. The edges 41, 42 on the storage unit 24 are slightly non-parallel and diverge apart in a rearward direction to define a slightly larger dimension at their open rear end 43 (i.e. trapezoidal shape), and the side modules 26 include a outwardly-raised protruding surface 44 defining a mating shape including top and bottom surfaces 45 and 46. By this arrangement, the storage unit 24 slides easily from its storage position (inside the truck bed) out onto the tailgate without interference or binding from the track. Similarly, when the storage unit 24 is pushed back into the truck bed, the recess 40 defines a vertical dimension that is sufficiently large to easily start the recess 40 back onto the protruding surface 44. As the storage unit 24 is pushed fully back into the truck bed to its storage position, the recess 40 and protruding surface 44 nest into each other and engage in a secure and positive manner that prevents undesired movement of the storage unit 24 during transport. It is contemplated that the surfaces 41, 42, 45, 46 can include a bump or other detent structure or frictional engagement to provide a slight retention of the storage unit 24 within the truck bed . . . and/or that informs the user that the storage unit 24 is fully seated onto the side modules 26-27.

As noted above, the side modules 26-27 can also have functional features incorporated therein. Side module 26 (FIG. 7A-7B) is rotationally molded to include spaced-apart inner and outer walls 50 and 51, with protrusions such as towers 52-53 extending therebetween for stability of the walls. Channel-shaped reinforcing ribs 54-55 further stabilize the walls 50 and 51. A recess 56 is formed in inner wall 51 and forms a cavity with netting 57 or other retainer for retaining items therein, such as for retaining various small items or tools (or fishing equipment, or cartridges, etc). A second top recess includes a pull-out light source 58, and is powered by connection with a flexible wire to the vehicle's electrical system, such as via power to the vehicle's rear lights. In one form, the light source 58 forms a pull-out spot light that can be pulled out and oriented to shine light in a selected direction. The illustrated light source 58 includes a clip/stand 58' that can be used to attach the light source 58 to a support structure to shine in a selected direction. The side module 26 includes one or more holes 59 for receiving a sheet metal screw to attach the side module 26 to a side wall of the truck bed. The screw can be a typical sheet metal screw with flat or Phillips head, or can be a headed screw with top head or handle configured to rotation by a user without tools. In such case, the side module 26 is made to be easily removable, and can be carried like a suitcase to an offsite location. If desired, the light source 58 can include a battery for remote powering of the light, and can include a handle forming depression such as depression 59.

Like left side module 26, the right side module 27 includes inner and outer walls 50 and 51, with tower 52 extending therebetween for stability, channel-shaped reinforcing ribs 54-55, and a recess 56. Recess 56 in right side module 27 is covered with a lockable cover 57'. A second top recess includes a permanent lens and light source 58". Also, the inner wall 51 includes a DC electrical plug 60' for connecting to vehicle 12V DC power. Also, a third recess 60 is configured to receive a specific tool, such as a screw driver. The recess 60 can be made to snappingly frictionally engage the tool as it is placed within the recess. The side module 27 includes one or more holes 59 for receiving a sheet metal screw to attach the side module 27 to a side wall of the truck bed. The screw can be a typical sheet metal screw with flat or Phillips head, or can be a headed screw with top head or handle configured to rotation by a user without tools. In such case, the side module 27 is made to be easily removable, and can be carried like a suitcase to an offsite location.

FIGS. 7E-7F show a particular pivot connection of the cover 23 to the storage unit 24. The lower rear corner of the storage unit 24 includes a notch 62. Further, the bottom wall 31 includes a rearward extended portion 63 with a down flange 64. This adds strength to the bottom wall 31, and further defines a receptacle for receiving a lower outer L-shaped protrusion 65 on the ends of the cover 23. The protrusion 65 includes an end section 66 that fits matably into the notch 62 for rotation between a cover open position (FIG. 1) and a cover closed position (FIG. 2). A metal stud 67 is extended through two walls of the down flange 64 and protrudes toward the notch 62. The inner "heel" of the end section 66 includes a slot 68 for slidably receiving the stud 67. A neck 68' of the slot 68 is slightly narrower than its bottom, such that the stud 67 is retained in the bottom of the slot 68, yet is rotatable. Thus, the cover 23 can be assembled to the storage unit 24 by engaging the cover 23 by moving the cover to cause the studs 67 on opposite ends of the storage unit 24 to engage the opposite ends of the cover 23. When engaged, the cover 23 is retained to the storage unit 24. When the cover 23 is pivoted to a closed position, the cover 23 cannot be removed from the storage unit 24. The cover 23 includes a pair of locks 70 that engage mating surface/slits in the top wall 30 of the storage unit 24. Thus, when locked, the cover 23 is secured to the storage unit 24 and cannot be easily disassembled.

An inside surface of the cover 23 includes various depressions and towers, each of which add strength and stability to the cover. Some of the depressions and towers are particularly shaped for functional reasons. For example, depression 72 is large and deep enough to act as a tray to hold assorted screws and the like. Tower 73 is large and deep enough to hold a coffee mug or drink bottle. It is contemplated that the depressions could also have tool-receiving shapes, similar to that shown in FIG. 7C. For example, a car jack and tire iron could be received in recessed in the cover 23. The cover 23 can also be made to be easily disconnected and used as a take-away portable tool transport. Further, the cover 23 can include lockable or otherwise covered recesses for holding items therein and can include handles to facilitate its transport.

Figure 11:
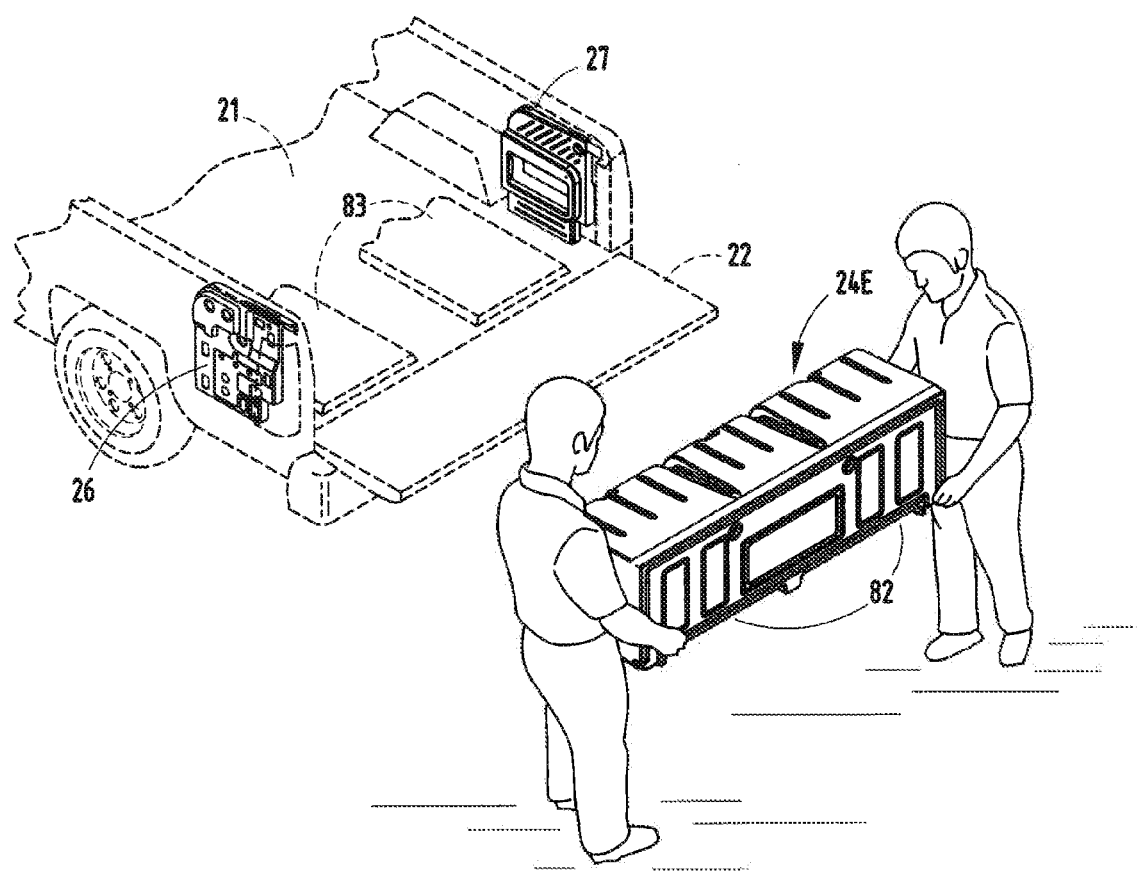
Figure 12:
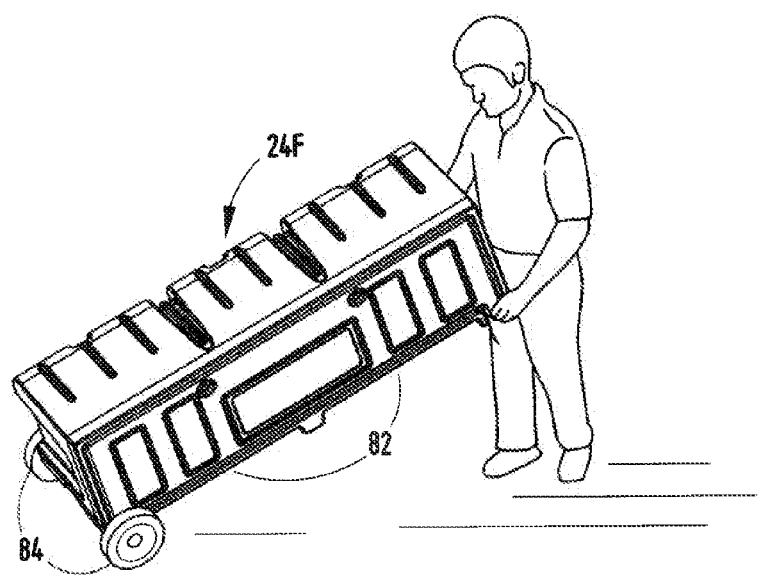

FIGS. 8-12 illustrate modified storage units 24A, 24B, 24C, 24E, and 24F, each of which include components and features similar to storage unit 24 (and which are similarly identified by identical numbers). Storage unit 24A (FIG. 8) includes dividers 76 that slidably engage upper and lower retainer channels 77 for subdividing the storage unit into different areas, such as to separate groceries and tools. Storage unit 24B (FIG. 9) includes a pull-out bin or tub 78 that can be slid between a storage position and a pull-out access position. Storage unit 24C (FIG. 10) includes top and rear walls 30 and 32 configured with grooves 38 for receiving a bike tire/wheel to hold the bike in an upright position during transport. Also, three tie-down anchors 37 are illustrated. Also, a spoiler 80 with an aerodynamic cross member is illustrated for assisting with uniform air flow across the storage bin and for aesthetics. Notably, the spoiler 80 can be made removable to allow better access to the grooves 79 if desired. The storage unit 24E (FIG. 11) is made to include handle-shaped undercuts 82 forming surfaces optimally positioned for grasping when the storage unit 24E is removed and carried to a job site. Notably, the undercuts 82 can be located on ends of the storage unit. (See FIG. 3 and FIG. 8.) Also, the undercuts 82 extend rearward under the storage unit 24E, such that it forms a channel suitable for receiving a ramp 83 (FIG. 11). The ramp 83 can be slid under the storage unit 24E onto the truck bed for storage, or can be pulled out and arranged for use, such as for forming an angled ramp up onto the truck's tailgate. Storage unit 24F (FIG. 12) includes a pair of wheels 84 at one end, such that the storage unit 24F can be rolled like a wheel barrow or two-wheeled cart to a job location.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A storage apparatus for storing items in a truck bed comprises:
   a storage unit shaped to fit into the truck bed; and
   an attachment system with side modules each having an inner surface mating with an end of the storage unit and an outer surface adapted to mate with an inside of the truck bed for holding the storage unit in a stable position in the truck bed, the storage unit being removably attached to the side modules, the side modules each having a storage recess and a retainer for holding an item in the storage recess, the storage recess being at least partially covered when the storage unit is attached to the side modules, but being exposed when the storage unit is removed.

2. The storage apparatus of claim 1, wherein the side modules define a rearwardly extending track that engages ends of the storage unit to facilitate pulling the storage unit onto a tailgate of the truck bed for easier access.

3. The storage apparatus of claim 2, wherein one or both of the side modules include functional features including at least one of:
   a stationary bed light, a pull-out spot light on a flexible cable, and an electrical power source plug.

4. The storage apparatus of claim 2, wherein the storage unit includes functional features including at least one of:
   a storage recess, pull-out containers and drawers, repositionable dividers for the storage recess, walls with internal depressions defining useful holders such as a cupholder or tool holder, a lockable cover, handles to facilitate carrying the storage unit away from the truck, wheels to facilitate rolling the storage unit like a two-wheel cart, walls with external depressions defining a cable anchor for tying down items in the truck bed, and an air deflector/spoiler for improved air flow and better gas mileage.

5. The apparatus defined in claim 1, wherein at least one of the side modules includes at least one lockable storage compartment.

6. The apparatus defined in claim 1, wherein at least one of the side modules includes wiring adapted for connection to the truck, and including a power outlet connected to the wiring.

7. The apparatus defined in claim 1, wherein at least one of the side modules includes a light source.

8. The apparatus defined in claim 1, wherein the storage unit includes drawers slidably mounted therein, and further includes a lock to prevent unauthorized access to the drawers.

9. The apparatus defined in claim 1, wherein the storage unit includes a wall defining at least one recess shaped to receive a bicycle wheel for stably supporting a bicycle stored thereagainst.

10. The apparatus defined in claim 1, wherein at least one of the side modules includes a handle for grasping and lifting, and wherein the at least one side module also includes a fastener with head configured for rotation without tools so that the at least one side module can be secured to the truck bed but can be released without the need for a separate tool.

11. The apparatus defined in claim 1, wherein the storage unit includes at least one handle for grasping and lifting.

12. The apparatus defined in claim 1, wherein the storage unit includes wheels for rolling along a floor surface.

13. The apparatus defined in claim 1, wherein the storage unit defines at least part of an elongated recess there under; and including
   a ramp telescopingly stored in the recess and extendable to provide an inclined surface to assist in moving heavy objects into the storage unit.

14. The apparatus of claim 1 wherein at least one of the side modules and storage unit include a light source for lighting an area associated with the storage unit.

15. The apparatus defined in claim 14, wherein the light source includes an extendable cable that can be extended to orient the light source in different directions.

16. The apparatus defined in claim 15, wherein the light source includes a clip for removable attachment adapted to support the light source on a separate support structure.

17. A storage apparatus for storing items in a truck bed having a tail gate, comprises:
   a storage unit including outwardly facing ends; and
   at least one side module with an outer surface adapted to mate with an inwardly-facing side of the truck bed for holding the side module in a stable position against the truck bed rearward of a vehicle wheel well and between the wheel well and a vehicle tailgate; the at least one side module further including an inner surface forming a track that is shaped to matably engage the outwardly facing ends of the storage unit for retaining the storage unit securely in the truck bed against the tail gate of the truck; the at least one side module further including at least one compartment and an access opening on an inboard side for accessing the at least one compartment, and at least one retainer for holding items in the compartment, and including a fastener for releasably retaining the side module in the stable position in the truck bed, the side module further having a handle that can be grasp for carrying the side module, the storage compartment being at least partially protected when the storage unit is attached to the side modules, but being exposed when the storage unit is removed.

* * * * *